United States Patent Office 3,336,143
Patented Aug. 15, 1967

3,336,143
CALCAREOUS REFRACTORY COMPOSITION
Merton L. Van Dreser, Campbell, and Warren G. Anderson, San Jose, Calif., assignors to Kaiser Aluminum & Chemical Corporation, Oakland, Calif., a corporation of Delaware
No Drawing. Filed Sept. 7, 1966, Ser. No. 577,588
22 Claims. (Cl. 106—58)

ABSTRACT OF THE DISCLOSURE

A method and composition for making high temperature refractory insulating material from a calcareous raw material such as dolomite or calcium carbonate, together with sufficient silica to form dicalcium silicate with the lime in the calcareous material, a stabilizer for dicalcium silicate, and a binder, is disclosed. After firing at a temperature of 1300° C. or higher, the firing temperature preferably being reached at a rate not exceeding 50° C. per hour, the shapes exhibit substantially the same dimensions as in the unfired state, but have lost a considerable fraction of their weight due to the driving off of $CO_2$ and have a density of the order of 75 lbs. per cubic foot.

---

This application is a continuation-in-part of our copending application S.N. 318,529, filed Oct. 24, 1963, now abandoned.

This invention relates to refractories of low thermal conductivity and to methods of making them.

The advantages of refractory materials of low thermal conductivity are well recognized and much effort has been expended in attempts to produce such refractories. These efforts have been relatively successful in producing refractories of the so-called "acid" type such as those based on fireclay and other silicate materials. However, these efforts have been less conspicuously successful in producing porous or insulating refractories from "basic" or "nonacid" materials such as magnesia, dolomite, periclase, or chromite, or mixtures of such materials.

Various methods of producing porous basic refractories are known. For example, it is known to form articles from mixtures of these materials with material, for example sawdust, which will burn out during the firing operation and leave a porous mass. It is also known to add agents which, during the forming operation, will create air or other gaseous bubbles in the refractory mass, thus forming pores when the mass is fired. However, these and other methods which might be mentioned have shortcomings of various sorts. For example, some are unduly expensive, some produce brick having little strength, especially at high temperatures, and some produce brick which undergo large shrinkage at elevated temperatures.

It has now been found that a strong, well tailored refractory shape with good insulating properties is made from basic materials as follows: To a calcareous material of a size such that at least 35% and preferably 45% is retained on a 65 mesh screen, such calcareous material desirably containing not over 0.8% by weight of $Al_2O_3$ plus $Fe_2O_3$, as impurities, is added a sufficient amount of finely divided silica so that the total $SiO_2$ content of the composition is sufficient to react with substantially all of the CaO in the composition to form dicalcium silicate. With the calcareous material and silica there is admixed from about 0.2% to about 2% of the total weight of CaO and $SiO_2$ in the composition of a material which stabilizes dicalcium silicate against its well known, disruptive crystalline inversion from the beta to the gamma form at 675° C. There is also admixed from about 1.5% to about 5% by weight of the total weight of dry ingredients of a binder, especially a room temperature setting or cold bonding cement.

The above dry ingredients are mixed with a tempering amount of water (for example, from 1% to 10% of the weight of dry ingredients) and the mixture formed into shapes by any of the well known ceramic forming processes, forming under pressure as by dry pressing being a preferred method. The formed shapes are thoroughly dried and then fired, preferably to a temperature of about 1600° C. or higher. The temperature of the shapes should be raised at a rate that will not cause disintegration of the shapes. Generally this rate will be less than 50° C./hour, particularly in the temperature ranges where $CO_2$ is evolved and where dicalcium silicate forms. Depending on such factors as the amount of $CaCO_3$ in the calcareous material and the sizing of the calcareous material, the rate of temperature increase may preferably be as low as 30° C./hour in some instances.

By the term "calcareous material" is meant material which contains a substantial portion of calcium carbonate. The term is intended to include relatively pure calcium carbonates (i.e., 95% or better $CaCO_3$), the so-called magnesium limestones (i.e., calcium carbonates combined with more than 5% magnesium carbonate), the so-called dolomitic limestones (i.e., calcium carbonates which contain between 30 and 45% magnesium carbonate), and dolomites, as well as artificial mixtures of $CaCO_3$ (or other calcium containing components which decompose with evolution of a gaseous product) with compatible materials such as $MgCO_3$. As is well known in the art, the ideal dolomite mineral contains equal molar quantities of magnesium carbonate and calcium carbonate. However, in practice the amount of these two carbonates may vary somewhat from the ideal mole ratio of 1:1. It is intended to include in the term calcareous material all such naturally occurring dolomites in the raw or uncalcined state. As previously mentioned the calcareous material used in this invention must be of a size such that a substantial amount of it (i.e., at least 35% and preferably at least 45%) is retained on a 65 mesh screen. Preferably, at least 20% of the calcareous material is retained on a 35 mesh screen. When material which is retained on a 14 mesh screen (i.e., that which is coarser than 14 mesh) is included in the mixture, it is found that while a strong shape of good insulating properties results, there is a tendency for the final fired product to have surface pits or "pops" where small amounts of material have spalled off the surface of the shape. Therefore, although shapes made from material some of which is coarser than 14 mesh have good insulating and strength properties, it is generally preferred to use calcareous material all of which passes a 14 mesh screen. When shapes are made from calcareous material substantially all of which passes a 35 mesh screen and particularly when substantially all of it passes a 65 mesh screen, the green or unfired shapes are weak, difficult to handle, and show excessive crumbling and cracking at the edges. Even after firing, such shapes are considerably weaker and additionally show greater firing shrinkage than shapes made from the preferred raw material. The total aluminum oxide and iron oxide impurities, i.e., the sum of the alumina and the iron oxide contents, in the calcareous material should be not over 0.8% for best results and is preferably as low as possible. It will be apparent from the above discussion that the raw material can contain quite substantial amounts (e.g., up to 50% or even more) of magnesium carbonate.

As is well known in the art, the calcareous raw materials of this invention, upon heating to the above specified temperatures, decompose to the fundamental oxides, CaO and MgO, evolving carbon dioxide ($CO_2$). Depending on the exact chemical composition of the calcareous material used, this evolution of $CO_2$ during the firing operation results in a loss of weight of up to 50% or more of the original weight of the shape. This chemical decomposition combined with the unexpected result that shapes made according to this invention show very little, if any, shrinkage during the firing operation, results in a strong porous refractory mass of good insulating properties. In general, the fired products will have a density less than 100 pounds per cubic foot, the precise value depending on, among other things, firing temperature. For example, one series of specimens had a density of 72 lb./ft.$^3$ after firing to 1300° C. and a density of 78 lb./ft.$^3$ after firing to 1600° C.

It is believed that at the firing temperatures of this process, substantially all the CaO in the mixture reacts with the $SiO_2$ present to form dicalcium silicate. In calculating the amount of silica to be added to the calcareous raw material in making up the batch, account is taken of all silica entering into the batch. Thus, the amount of silica contained in the calcareous raw material itself is taken into account, as well as any silica contained in the room temperature setting cement, as for example when that cement is a sodium silicate.

While the added silica can be any finely divided silica, a preferred material is the material of commerce known as silica flour. It is made by grinding sand obtained, for example, from the Monterey peninsula. Preferably, the silica flour is of a size such that substantially all of it passes a 150 mesh screen. Chemically, the silica flour contains at least 99% $SiO_2$. Other representative sources of silica are sand, especially such as passes through a 200 mesh screen, and volatilized silica. Volatilized silica is a very finely divided silica containing about 95% $SiO_2$, about 2% material lost on ignition, largely carbon, and from about 2% to about 3% of iron oxide, magnesium oxide and aluminum oxide, and obtained, for example, as a condensate from furnaces being operated to produce silicon alloys such as ferrosilicon. Mixtures of silicas from different sources can be added. In the preferred embodiment, at least part of the silica, preferably from 1% to 3% of the total weight of dry materials, can be volatilized silica, the remainder of the added silica being finely divided silica.

The stabilizer (against crystalline inversion) of the dicalcium silicate is any one of various materials well known in the art to have this stabilizing effect. Typically, such material can be a phosphorous-containing compound, a chromium-containing compound, or a boron-containing compound. The boron-containing compounds are preferred and can be such materials as manganese borate, colemanite, boric acid, and, preferably, alkali metal borates. Sodium tetraborate is a preferred material. Useful sources of phosphorous are sodium orthophosphate, monosodium dihydrogen orthophosphate, calcium orthophosphate, sodium tripolyphosphate, sodium hexa meta phosphate, and the like. The stabilizer is added in an amount of from about 0.2% to about 2% by weight of the amount of dicalcium silicate formed by reacting the CaO and $SiO_2$ in the batch. It will be understood that the amounts of silica and stabilizer to be added will depend on the chemical composition of the particular calcareous and other raw materials used, and it will be clear to those skilled in the art that the amounts to be added can readily be determined once the chemical analyses of the raw materials are known.

The binder or room temperature bond or cold setting cement can be any of such materials well known in the art. Typical are the phosphate cements, Sorel cements (made, for example, by mixing magnesium sulphate or magnesium chloride or both with magnesium oxide in weight ratios adapted to form the cementitious oxysalt upon admixture with water), sodium silicate and chromic acid. It is believed that the room temperature setting cement performs at least two important functions. First, it makes the shaped product strong enough to be handled at room temperature. Second, it gives strength to the shape at the temperature at which the carbon dioxide is evolved and prevents disruption of the shape by the evolution of the large quantities of gas involved. It is possible to use the same material as binder or cement and as stabilizer of dicalcium silicate. Thus, for example, boric acid will act both as a stabilizer and as a room temperature binder or cement. Similarly, certain of the phosphorous compounds mentioned above, for example, sodium tripolyphosphate, can be used as binders.

It is an advantage of this invention that by it there can be produced insulating refractories from readily available materials of a basic (as opposed to an acidic) chemical nature. The insulating refractory shapes of this invention have the further advantage that they can be used at temperatures well above the original firing temperature without showing excessive shrinkage. Thus, for example, they can be heated to 1950° C. with very little, if any, further shrinkage, and thus retain their good insulating properties, in some instances.

The products of this invention are useful in small, laboratory high temperature kilns, for lining stack kilns, either as back-up insulation or for the complete lining, in glass tank regenerator walls, again either as back-up insulation or to make the entire wall, in boilers, ceramic kilns, annealing furnaces, forging furnaces, and the like. In other words, the product of this invention is useful wherever a refractory material of good strength and high insulating value is useful.

While the products of this invention are most useful as shapes, they can also be crushed and the resulting grog used, when combined with cold setting cements, ceramic fluxes, and the like, as a refractory castable, gunning, ramming or plastic mixes.

The following specific examples will illustrate the mode of carrying out the process of this invention and some embodiments of products according to the invention.

*Example 1*

Together with 84.0 parts by weight of Natividad dolomite, 10.8 parts by weight of silica flour, all passing a 150 mesh screen, 0.7 part by weight of anhydrous sodium tetraborate and 2.0 parts by weight of sodium silicate were dry mixed for 5 minutes. The dolomite used showed the following ultimate chemical analysis:

| | Percent by weight |
|---|---|
| CaO | 31.33 |
| MgO | 21.11 |
| $SiO_2$ | 0.36 |
| $Al_2O_3$ | 0.04 |
| $Fe_2O_3$ | 0.16 |
| Loss on ignition | 47.00 |

The sizing of the dolomite was 100% through a 20 mesh screen, 24.6% retained on 35 mesh screen, and 47.7% retained on a 65 mesh screen. The sodium silicate was a powder having an analysis as follows: $Na_2O$, 27.0%; $SiO_2$, 54.0%; and $H_2O$, 18.5%, the remainder being impurities. After the above ingredients were dry mixed 5 minutes, water in the amount of 3% by weight of the total dry batch was added and wet mixing continued for 3 minutes. After this, 2.5 parts by weight of volatilized silica were added and the wet mixing continued for 10 more minutes. The mix was then pressed at a pressure of about 1750 lbs. per square inch to form green shapes having dimensions 9" x 4½" x 3" and having green densities of about 122 lbs. per cubic foot. This formed shape was thoroughly dried in air for 4 hours and then at 150° C. for 12 hours. After firing at a temperature of 1475° C., the fired shape had a bulk density of 75 lbs. per cubic foot. The fired shape had a well-tailored form without warping or cracking. It had a cold crushing strength of 1200 p.s.i., and a thermal conductivity at 2320° F. of 3.0 B.t.u./hr. ft.$^2$ ° F. for a 1 inch thickness.

When the above procedure was followed except that an Australian dolomite having a total $Al_2O_3$ plus $Fe_2O_3$ of 1.28% was used, the resulting shape showed excessive shrinkage and warping after firing, demonstrating the desirability of using high purity materials as defined herein. Likewise, when the above procedure was followed but using dolomite all of which passed a 65 mesh screen, the resulting shape was weak and had shrunk excessively.

*Example II*

The following dry ingredients: 75 parts by weight of Vermont calcite, 23 parts by weight of silica flour, 1.0 part by weight of boric acid ($H_3BO_3$) and 3.0 parts by weight of lightly calcined or reactive magnesium oxide (MgO), were mixed with an aqueous 40% magnesium sulphate solution in such amount that the mole ratio of the calcined magnesium oxide to magnesium sulphate was 3:1. Sufficient further tempering water was added so that the total water content was 3 weight percent of the weight of the dry batch. The mixture was processed as in Example I. The final product, after firing to 1475° C., had a fired density of 75 lbs. per cubic foot. The calcite used contained over 99.5% $CaCO_3$, the remainder being impurities, $SiO_2$ being the major one. The $Fe_2O_3$ content wast 0.05%. The particle size distribution of the calcite was as given for the dolomite of Example I.

*Example III*

To 80.2 parts by weight of the dolomite of Example I were added 13.6 parts by weight of —150 mesh silica flour, 4.7 parts by weight of lightly calcined or reactive magnesium oxide, 0.9 part by weight of boric acid ($H_3BO_3$) as a dry powder, and 0.6 part by weight of magnesium sulphate ($MgSO_4$) added as a 40% solution in water. The mixture was formed by dry pressing, and the formed shape dried in air for 4 hours and then at 150° C. for 12 hours. After firing to 1350° C., the shape had a fired density of 72 lbs. per cubic foot. Before firing, the density of the dried shape was 140 lbs. per cubic foot.

It has also been found that the expansion or shrinkage during firing of shapes according to this invention can be more readily controlled if there is included in the raw material composition from 0.1% to 0.2% citric acid. In other words, inclusion of citric acid in the composition apparently broadens the firing range over which the dimensions of the fired shape are substantially equal to that of the raw formed shape. While more than 0.2% citric acid can be used and has the effect of stabilizing the fired dimensions of the shape, it has been found that larger amounts than this have the effect of drying the raw material batch, making it more difficult to form. Accordingly, it is preferred to limit the additions of citric acid to 0.2%.

*Example IV*

As an example of the use of citric acid, a composition was made consisting of 82.9 parts of the dolomite of Example I, 11.4 parts —200 mesh silica sand, 1.95 parts volatilized silica, 1.95 parts sodium silicate, 1.7 parts borax, and 0.1 part citric acid. About 75% of the dolomite was retained on a 65 mesh screen and about 50% retained on a 35 mesh screen. After the addition of about 3% tempering water, standard refractory brick shapes were formed from the mixture. After drying, these were fired to a temperature of 1600° C. at a rate of 30° C. per hour during both heating and cooling. The fired brick had a density of about 78 lbs. per cubic foot and a porosity of about 60 volume percent. After firing, the brick had substantially the same dimensions as prior to firing and required no cutting or grinding to give a true, well tailored shape.

While the products of this invention will generally be used in the fired state, it is possible to build a furnace, for example, of unfired shapes of the invention. When the furnace is heated up, the shapes will be, in effect, fired and develop their insulating properties. When used in this way, the shapes will have different thermal conductivities at different points, depending on the temperature to which the particular point considered has been heated.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, 3rd Edition, 1950, published by McGraw-Hill Book Company at page 963. For example, a size passing a 35 mesh screen corresponds to 0.0164 inch (0.417 mm.), and passing 65 mesh to 0.0082 inch (0.208 mm.). Analyses of mineral components are reported in the usual manner, expressed as simple oxides, e.g., MgO, $SiO_2$, etc., although the components may actually be present in various combinations, e.g., as a magnesium silicate. The bulk density of the fired shape is determined by weighing the shape and dividing that weight (in pounds) by the volume of the shape (in cubic feet) determined by measurement of its dimensions or by any other method of volume determination known to those skilled in the art.

Having now described the invention, what is claimed is:

1. The process of making a basic refractory shape comprising: (1) mixing (a) a raw calcareous material containing a substantial portion of calcium carbonate, at least 35% of which is retained on a 65 mesh screen and at least 20% is retained on a 35 mesh screen, said calcareous material containing not over 0.8% $Al_2O_3$ plus $Fe_2O_3$, (b) sufficient finely divided silica so that the total $SiO_2$ in the mixture is sufficient to react upon heating with substantially all the CaO in the mixture to form dicalcium silicate, (c) from 0.2 to 2% of the total weight of CaO and $SiO_2$ present of a material adapted to stabilize dicalcium silicate against crystalline inversion, (d) from 1.5% to 5% of the total weight of dry materials of a binder, (e) and a tempering amount of water, (2) forming said mixture into shape, (3) drying said shape, and (4) firing said shape, the shape being raised to a firing temperature of at least about 1300° C. at a rate not exceeding 50° C. per hour.

2. The process according to claim 1 wherein said shape is fired to a temperature of at least about 1600° C.

3. The process according to claim 1 wherein at least part of said added finely divided silica is volatilized silica, wherein said material adapted to stabilize dicalcium silicate is anhydrous sodium tetraborate, and wherein said binder is sodium silicate.

4. The process according to claim 3 wherein said calcareous material is dolomite.

5. The process according to claim 4 wherein said volatilized silica constitutes from 1% to 3% of the total weight of the dry ingredients of the mixture.

6. The process according to claim 4 wherein said forming is by pressing.

7. The process according to claim 1 wherein said mixture is formed into shape under pressure.

8. The process according to claim 1 wherein there is included in the mixing of step (1) from 0.1% to 0.2% citric acid.

9. A refractory composition consisting essentially of: (1) a raw calcareous material containing a substantial portion of calcium carbonate, at least 35% of which is retained on a 65 mesh screen and at least 20% is retained on a 35 mesh screen, said calcareous material containing not over 0.8% $Al_2O_3$ plus $Fe_2O_3$, (2) sufficient added finely divided silica so that the total $SiO_2$ in the composition is sufficient to react upon heating with substantially all the CaO in the composition to form dicalcium silicate, (3) from 0.2% to 2% of the total weight of CaO and $SiO_2$ in the composition of a material adapted to stabilize dicalcium silicate against crystalline inversion, and (4) from 1.5% to 5% of the total weight of dry materials of a binder.

10. A refractory composition according to claim 9 wherein at least 45% of said calcareous material is retained on a 65 mesh screen, wherein substantially all of said added silica passes a 150 mesh screen, and wherein said material adapted to stabilize dicalcium silicate is a boron-containing compound.

11. A refractory composition according to claim 10 wherein said boron-containing compound is sodium tetraborate.

12. A refractory composition according to claim 10 wherein said binder is sodium silicate.

13. A refractory composition according to claim 9 wherein at least part of said finely divided silica is volatilized silica.

14. A refractory composition according to claim 13 wherein said volatilized silica constitutes from 1% to 3% of the total weight of the dry ingredients of the mixture.

15. A refractory composition according to claim 13 wherein said material adapted to stabilize dicalcium silicate is a boron-containing compound.

16. A refractory composition according to claim 15 wherein said boron-containing compound is sodium tetraborate.

17. A refractory composition according to claim 13 wherein said binder is sodium silicate.

18. A refractory composition according to claim 9 wherein said calcareous material is dolomite, wherein all of said finely divided silica passes a 150 mesh screen, wherein said material adapted to stabilize dicalcium silicate is anhydrous sodium tetraborate, and wherein said binder is sodium silicate.

19. A refractory composition according to claim 9 wherein said calcareous material is dolomite at least 45% of which is retained on a 65 mesh screen and wherein all of said finely divided silica passes a 150 mesh screen.

20. A refractory composition according to claim 9 wherein there is added from 0.1% to 0.2% citric acid.

21. A fired porous refractory insulating shape made from a batch consisting essentially of (a) a calcareous material, said calcareous material in the raw state containing a substantial portion of calcium carbonate, at least 35% of which is retained on a 65 mesh screen and at least 20% retained on a 35 mesh screen, said calcareous material containing not over 0.8% $Al_2O_3$ plus $Fe_2O_3$, (b) sufficient finely divided silica so that the total $SiO_2$ in the mixture is sufficient to react upon heating with substantially all the CaO in the composition to form dicalcium silicate, (c) from 0.2 to 2% of the total weight of CaO and $SiO_2$ in the mixture of a material adapted to stabilize dicalcium silicate against crystalline inversion, and (d) from 1.5 to 5% of the total weight of dry materials of a binder.

22. A porous refractory insulating shape according to claim 21 wherein at least 45% of said calcareous material is retained on a 65 mesh screen, wherein at least part of said finely divided silica is volatilized silica, wherein said material adapted to stabilize dicalcium silicate is anhydrous sodium tetraborate, and wherein said binder is sodium silicate.

References Cited

UNITED STATES PATENTS

| | | | |
|---|---|---|---|
| 2,015,446 | 9/1935 | Cape et al. | 106—63 |
| 2,647,062 | 7/1953 | Lathe | 106—58 |
| 3,075,848 | 1/1963 | Davies et al. | 106—58 |

OTHER REFERENCES

Chadeyron et al., High-Porosity Dolomite Bricks, Parts (I) and (II), Trans. Br. Cer. Soc., vol. 46, pp. 125–132, 1947.

TOBIAS E. LEVOW, *Primary Examiner.*

J. E. POER, *Assistant Examiner.*